P. KRUSE.
CAN GRIPPING DEVICE.
APPLICATION FILED JULY 9, 1912.
1,074,630.
Patented Oct. 7, 1913.
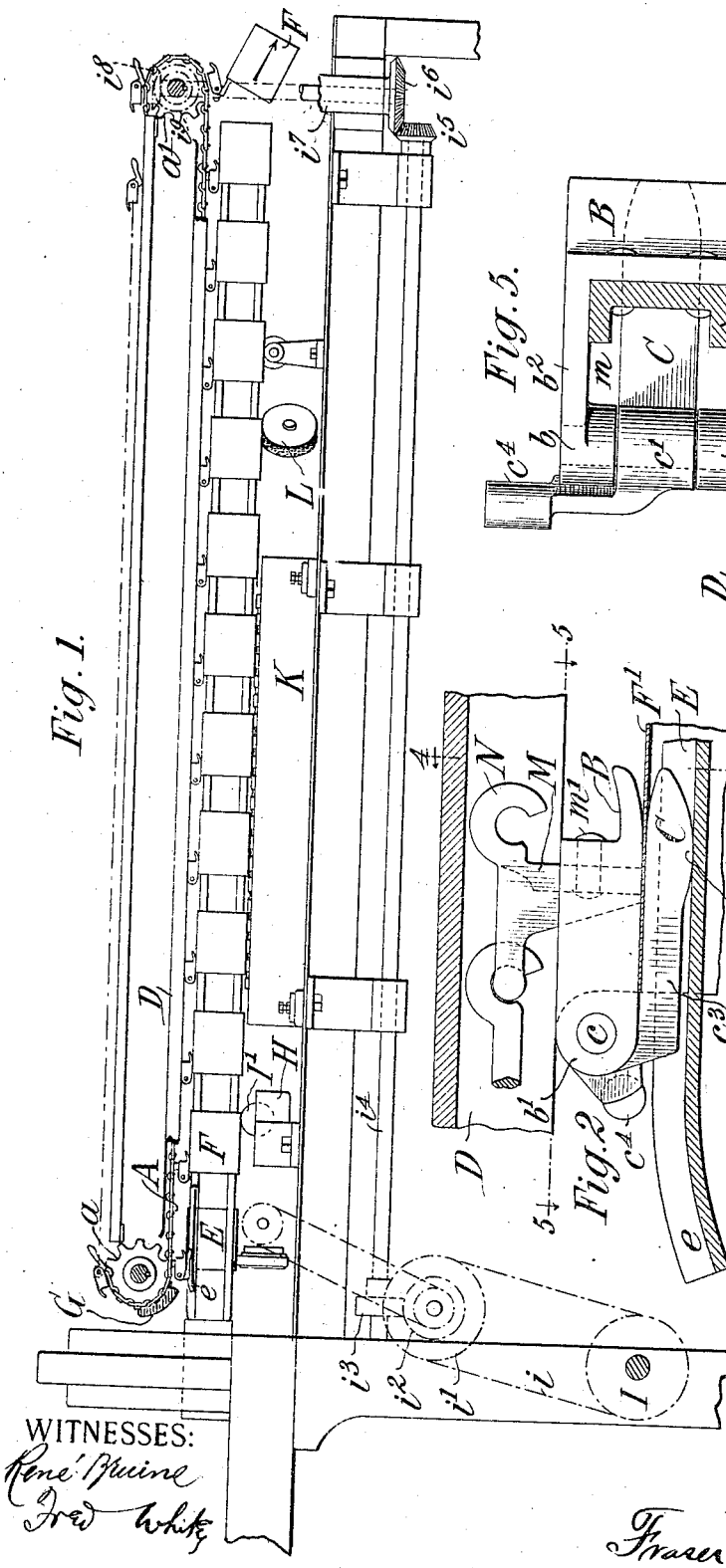
WITNESSES:
René Bruine
Fred White
INVENTOR:
Peter Kruse,
By Attorneys,
Fraser, Tuck & Myers

UNITED STATES PATENT OFFICE.

PETER KRUSE, OF NEW YORK, N. Y., ASSIGNOR TO E. W. BLISS COMPANY, OF BROOKLYN, NEW YORK, A CORPORATION OF WEST VIRGINIA.

CAN-GRIPPING DEVICE.

1,074,630. Specification of Letters Patent. Patented Oct. 7, 1913.

Application filed July 9, 1912. Serial No. 708,458.

*To all whom it may concern:*

Be it known that I, PETER KRUSE, a citizen of the United States, residing in the borough of Brooklyn, county of Kings, city and State of New York, have invented certain new and useful Improvements in Can-Gripping Devices, of which the following is a specification.

My invention relates to gripping devices for gripping cans and the like, such as thin metal plates or sheets, and will be found particularly useful in connection with machines wherein the gripping device is employed as a traveling carrier for carrying cans or similar articles while the same are being treated, such for intsance as by having solder applied thereto.

The invention has for its object to provide a simple gripping device which shall with certainty seize and firmly hold the can or like article while it is being fed through the machine and treated, and which shall with certainty discharge the said can or other article at the desired point.

My invention consists in the traveling gripping device which is illustrated as supported at intervals from a continuous chain.

The gripping device comprises jaws which are relatively movable and are adapted to grip the can or other article between them, in combination with fixed guides between which the jaws travel and which serve to hold the jaws firmly gripped upon the article being carried.

Further, it consists in so constructing the said jaws that upon their emerging from the guides they will drop apart and release the can or other article, and in providing in connection with the jaws means whereby the same are brought together in position to enter the guides.

A desirable manner of constructing my invention and one use for the same, is illustrated in the accompanying drawings, wherein,—

Figure 1 is a side elevation of a portion of a machine for soldering cans illustrating my invention applied thereto; Fig. 2 is a detail longitudinal section of one of my improved gripping devices and the guides therefor illustrating a can gripped between the jaws; Fig. 3 is a detail view of the left hand end of the machine as illustrated in Fig. 1, slightly enlarged, parts being shown in section; Fig. 4 is a transverse section on the line 4—4 in Fig. 2 looking to the left; Fig. 5 is a horizontal section on the line 5—5 in Fig. 2 looking down; Fig. 6 is a rear elevation of one of the gripping devices.

I have illustrated my invention as supported from the links of a continuous sprocket chain A which passes over sprocket wheels $a$ $a^1$. The gripping devices which are supported at intervals from the said links comprise upper jaws B which are fixed in position upon the links, and lower jaws C which are pivotally supported upon the upper jaws, as for instance by a pivot $c$ which passes through the forked end $b$ $b^1$ of the upper jaw and likewise through a raised hub $c^1$ on the lower jaw. The can is gripped between the said jaws, and for the purpose of effectually gripping the same and holding the same at the point of the jaws, the lower jaw C is preferably made with a slight bulge $c^2$ at its forward lower side.

The jaws are held together in gripping position by means of upper guides D and lower guides E. The upper guide D is preferably made in the form of a channel providing room for the sprocket chain A to pass through the same in the said channel without necessarily touching the guide. Depending side flanges $d$ $d^1$ upon both sides are in position to engage the projecting sides $b^2$ $b^3$ of the upper jaw B as the same is carried along and to hold the same in gripping position. The lower jaw C is likewise provided with a fixed guide E which is also illustrated as of channel form but inverted in position with respect to the guide D. This guide E is adapted to engage against the lower jaw C and to hold the same in gripping position. For this purpose the construction illustrated is well adapted. Here the said guide E is made trough-shaped and is adapted to receive the guiding rib $c^3$ upon the lower face of the lower jaw. The enlargement $c^2$ upon the said lower jaw causes the gripping effect to be pronounced at the point of the jaw where it is desired. The said jaws will securely hold a can as the gripping device travels from one end of the machine to the other throughout the entire length of the guides D E, and these guides extend from the point where it is desired to grip the can unto the point where it is desired to discharge the can. When the jaws of a gripping device have passed beyond the ends of the said guides, as illustrated at the right hand end of Fig. 1, the lower jaw will turn upon its pivot and drop away from the upper jaw, thereby releasing and discharging the can which is lettered F. The particular gripping device from which the can was just discharged will then pass around the sprocket wheel in its return journey, and the lower gripping jaw will lie in the position illustrated at the upper part of Fig. 1. This jaw will occupy such position until it passes around the sprocket wheel $a$, whereupon the jaw will swing upon its pivot and point downward. At this time a tailpiece $c^4$ with which the said jaw is provided, and which is located to the rear thereof and projects from one side of the gripping device, will engage against a cam G which is fixed in position, and will turn the jaw C upward sufficiently so that the same shall pass within the flaring end $e$ of the lower guide E (Fig. 3). At this time the gripping device is in position to have a can head or other object to be gripped and treated fed thereto. The said can heads, etc., may be fed by hand if desired, or they may and preferably will be fed by suitable feeding devices, such as the means illustrated in my patent, dated January 21, 1913, No. 1,050,956.

The particular machine with which I have illustrated my invention, is one designed to apply solder to the can seam, and is a machine of the type illustrated in my said patent. The gripping devices, however, illustrated in said patent are omitted, and in place thereof my improved gripping devices are substituted.

Motion is given to the gripping devices and to the can heads carried thereby from a pulley I through belt $i$, pulley $i^1$, worm $i^2$ $i^3$, shaft $i^4$, bevel gears $i^5$ $i^6$, shaft $i^7$, bevel gears $i^8$ $i^9$.

In the machine illustrated in Fig. 1, the cans having been suitably fed to the machine and gripped between jaws B C, are exposed to an acid bath from tank H through roller I'. They are then treated by having solder applied thereto from tank K, as for instance by the roll illustrated in my said patent, but not here illustrated, and the cans are then brushed off if desired by a brush L. The cans are then conveyed by the carrier A to the end of the machine, where the guides D E stop and the jaws B C are released and the can F is discharged therefrom.

In Fig. 2 a can which is there lettered $F^1$ is illustrated as being gripped between the jaws B C, and it will there be seen that the bulge $c^2$ upon the lower jaw will be the part thereof which will press against the lower guide E and will cause the can to be gripped at the forward part of the said jaws.

The particular construction of parts illustrated comprises a flange M which is pendant from one of the links, for instance link N of the chain A. The upper jaw B is a substantially rectangular shaped frame surrounding opening $m$ which receives the said pendant flange M and is secured thereto by rivets $m'$ (Fig. 2).

The particular manner of constructing and supporting the parts is not essential, nor is my invention limited to employment with cans, as other thin metal substances could equally well be treated.

While I have illustrated my invention as applied to a machine for soldering the cans, it is not limited in its usefulness to such machine and may be used with many other constructions of machines.

While I have described in some detail the particular manner of construction and operation of the various parts employed by me, it will be understood that I reserve the right to change the same, and to employ equivalent devices within the limits of the appended claims.

I claim as my invention:—

1. A traveling device for gripping cans and the like, comprising a pair of jaws pivotally connected, one of which is adapted to grip the inner surface of a can and the other of which is adapted to grip the outer surface of a can, a carrier for said jaws, fixed guides extending the length of the operative travel of the jaws between which said jaws travel and which hold the jaws in gripping position upon a can, means for bringing said jaws together before they enter the guides, and said jaws adapted to separate and release the can upon emerging from said guides.

2. A traveling device for gripping cans and the like, comprising an upper jaw, a lower jaw pivoted thereto, upper and lower guides adapted to hold said jaws in gripping position, said jaws adapted to separate and release the can upon emerging from said guides, a tail-piece on said lower jaw, and a fixed projection on the machine adapted to be engaged by said tail-piece and to swing the lower jaw to position to enter the lower guide.

3. A traveling device for gripping cans and the like, comprising an upper jaw, a lower jaw pivoted thereto, fixed guides adapted to engage said jaws and to hold the same in position, means for carrying said jaws, said lower jaw adapted to swing on its pivot and to release the can upon emerging from its guide, a tail-piece on said lower jaw, and a fixed projection on the machine adapted to be engaged by said tail-piece and to swing the lower jaw to position to enter the lower of said guides.

4. A traveling device for gripping cans and the like, comprising a flexible continuous carrier, gripping devices secured at intervals thereto, each comprising an upper jaw, a guide overlying a portion of said jaw and adapted to hold the same against movement out of gripping position, a lower jaw pivoted to said upper jaw, and a channel guide holding said lower jaw against movement out of gripping position.

5. A traveling device for gripping cans and the like, comprising a flexible continuous carrier, gripping devices secured at intervals thereto, each comprising an upper jaw, a guide overlying a portion of said jaw and adapted to hold the same against movement out of gripping position, a lower jaw pivoted to said upper jaw, a channel guide holding said lower jaw against movement out of gripping position, said lower jaw adapted to swing on its pivot and to release the can upon emerging from its guide, a tail-piece on said lower jaw, and a fixed projection on the machine adapted to be engaged by said tail-piece and to swing the lower jaw to position to enter said channel guide.

6. Devices for gripping cans and the like comprising pivotally connected traveling gripping jaws arranged in pairs, one of which is adapted to grip the inner surface of a can and the other is adapted to grip the corresponding outer surface, fixed guides each adapted to directly engage one of said jaws and to press the said jaws together and hold them in gripping position.

7. Devices for gripping cans and the like comprising pivotally connected traveling gripping jaws arranged in pairs, one of which is adapted to grip the inner surface of a can and the other is adapted to grip the corresponding outer surface, a continuous chain carrying said gripping devices, fixed guides each adapted to engage one of said jaws and to press the said jaws together and hold them in gripping position, and one of said guides providing a longitudinal channel for the passage of said chain carrier.

In witness whereof, I have hereunto signed my name in the presence of two subscribing witnesses.

PETER KRUSE.

Witnesses:
WALTHER THOMA,
FREDK. C. FLADD.

Copies of this patent may be obtained for five cents each, by addressing the "Commissioner of Patents, Washington, D. C."